United States Patent [19]
Besal

[11] Patent Number: 5,165,189
[45] Date of Patent: Nov. 24, 1992

[54] ACCESS DOOR FOR DUCTWORK

[76] Inventor: Bernard P. Besal, 620 Grove Rd., Pine Lake, Ga. 30072

[21] Appl. No.: 698,312

[22] Filed: May 10, 1991

[51] Int. Cl.⁵ .............................................. E06B 3/32
[52] U.S. Cl. ...................................... 49/463; 49/466; 49/506; 138/92; 220/327
[58] Field of Search ......................... 49/463, 466, 506; 138/92; 220/327, 663

[56] References Cited

U.S. PATENT DOCUMENTS

| 624,715 | 5/1899 | Wenz | 138/92 |
|---|---|---|---|
| 1,456,601 | 5/1923 | Johnson, Jr. et al. | 138/92 |
| 3,654,379 | 4/1972 | Rodgers | 49/463 X |
| 4,233,697 | 11/1980 | Cornwall | 220/327 X |
| 4,530,443 | 7/1985 | Gorges | 220/327 |
| 4,643,878 | 2/1987 | Seiter et al. | 220/327 X |
| 4,913,127 | 4/1990 | Dugger | 49/463 X |

Primary Examiner—Philip C. Kannan
Attorney, Agent, or Firm—Hurt, Richardson, Garner, Todd & Cadenhead

[57] ABSTRACT

An access door assembly for allowing access to the interior of a duct, including a mounting and support frame mounted at a selected location on the duct where an access port previously has been created in the duct, a cover releasably secured to the mounting and support frame by securing means, and a seal interposed between the cover and the mounting and support frame to prevent communication between the interior of the duct and the ambient when the cover is mounted on the frame.

8 Claims, 6 Drawing Sheets

ACCESS DOOR FOR DUCTWORK

BACKGROUND OF THE INVENTION

1. Field of the invention

This invention relates generally to the field of access doors providing access to the interior of a duct, and specifically to an access door designed to provide easy access to the interior of grease ducts and other ducts serving, for example, commercial and institutional kitchens, allowing the cleaning, servicing and inspection of the ducts, or any wires, equipment, or other components located within the ductwork.

2. Prior Art

It often is desirable to have easy access to various different types of ductwork. For example, prior to the installation of the ductwork, it may necessary to install fire system equipment or nozzles and install or reset dampers on the interior of the ductwork. However, once the ductwork has been installed at a site, it may be advantageous to install these access panels after other mechanical and/or electrical equipment has been installed so that areas chosen for the installation of the access panels will least interfere with opening of the access panels and/or will be the best location based on intended use and application. Additionally, it may be difficult, if not impossible, to access the interior of the ductwork without cutting a hole in the ductwork or otherwise breaching the integrity of the duct wall after the ductwork has been installed. It especially is desirable to be able to access the interior of ductwork used as exhaust ducts so as to be able to remove any buildup on the interior surfaces of the duct wall.

For ductwork used as the exhaust or grease ducts serving commercial and institutional kitchens, flammable byproducts, such as grease, may attach to the interior surface of the ducts. This grease buildup often is flammable and grease fires within the exhaust ductwork can be a common occurrence. In order to clean and inspect or to maintain equipment which may possibly be located within the duct, various building and safety codes require a certain number of access ports in the ductwork in order to be able to both clean out the ductwork and to combat any grease fires which may occur in the ductwork. Historically, access ports generally were created by cutting out a portion of the ductwork or the duct wall so as to allow access to the interior of the duct, and then screwing or otherwise attaching a coverplate over the port. Such access ports often employ numerous fasteners which may require removal and replacement through the use of handtools. However, often such cut-and-cover access ports are not sufficiently well-built so as to survive a fire, that is, are not structurally safe, or to prevent flames from licking out from between the cover and the duct wall.

U.S. Pat. No. 4,913,127 to David E. Dugger, for a fire resistant duct access door for cooking equipment exhaust systems, discloses one apparatus for allowing access to the exhaust ductwork system for kitchen cooking equipment, particularly in commercial establishments. The Dugger access door comprises an access collar secured to the ductwork supporting a support shoulder. The support shoulder in turn allows the attachment of a seal means and the access door, which are releasably attached to the access collar. The Dugger access door suffers from several disadvantages. First, the access collar protrudes a relatively large distance from the ductwork surface, thus presenting a large, outwardly projecting profile. Therefore, the Dugger access door is not well-suited for applications having limited space around the ductwork. Secondly, the access collar presents additional surfaces on which grease or other contaminates can gather. Third, as the Dugger access door generally is welded to the ductwork, it presents certain dangers with respect to retrofitting the access door onto already used ductwork, as the welding process may ignite the grease which already has built-up on the inner surface of the ductwork.

A code effected in 1991 provides that only those doors listed by Underwriters Laboratories may contain or employ fasteners which penetrate the wall of the duct. For example, the access doors must pass certain penetration tests when exposed to flames. Therefore, a new generation of access doors is required and desirable both to comply with these new code sections and, at the same time, which can be installed on new ductwork or retrofitted on to existing ductwork without causing the fire hazard created by the welding process.

BRIEF SUMMARY OF THE INVENTION

An access door assembly which both satisfies the requirements described above and does not comprise the disadvantage of the prior art is accomplished by the present invention. The access door assembly includes a support frame attached to the surface wall of the ductwork surrounding on access port in the duct wall, a cover to seal off the access port, and a gasket between the cover and duct wall or frame to prevent flames from escaping from the duct interior in the event of a grease fire. The support frame also supports the edges of the access hole cut into the ductwork. The support frame has support studs depending outwardly normal from the frame. In a first embodiment, the retrofit embodiment, the support frame is located in the interior of the duct, attached flush against the interior wall surface of the duct surrounding the access port. In this first embodiment, the support studs extend through holes drilled into the ductwork, such that the support studs extend outwardly from the interior of the duct through the ductwork to the exterior of the duct. In a second embodiment, the new installation embodiment, the support frame is located exterior of the duct, attached flush against the exterior wall surface of the duct surrounding the access port. In this second embodiment, stud holes are not necessary through the duct wall.

An access or cover door having dimensions generally similar to the dimensions of the support frame and having stud holes in locations corresponding to the locations of the support studs is used to cover the access port. A fire-resistant gasket is attached to the duct-side or inside edge of the access door such that when the access door is fitted over the support studs and secured to the duct, the sealing gasket contacts the ductwork or frame, thus sealing the access port, and the interior of the duct, from the outside. Generally, wing nuts or other securing means are placed on the support studs so as to force the access door against in a sealing position the ductwork.

The access door apparatus can be retrofitted onto existing ductwork or can be installed onto the ductwork prior to the installation of the ductwork at a site. As the support frame can be held onto the ductwork by the use of e clips, the access door assembly can be retrofitted onto existing ducts having grease buildups without the fire hazard created by the welding process. However, if the access door assembly is installed onto new ductwork, the support frame can be welded onto the duct wall as no grease is present to create a fire hazard.

All of the components of the access door assembly are designed to meet or exceed the minimum requirements established by the appropriate health or safety associations. The frame support, supports studs and access door are constructed of materials which will withstand the heat of a grease fire. The sealant gasket between the access door and the ductwork also is constructed of a material which will withstand the heat of a grease fire, such that the seal between the access door and the ductwork will retain its integrity throughout a grease fire, and prevent fire from escaping the duct through the access port when the cover is secured.

Accordingly, it is an object of the present invention to provide an access door for ducting systems which remains structurally intact and leakproof under duct fire conditions.

It is another object of the present invention to provide an access door for ducting systems which provides easy access to the interior of the ducting systems.

Another object of the present invention is to provide an access door for ducting systems for use in commercial and institutional kitchen ventilation systems allowing one to clean, service and inspect the interior of the venting ductwork systems.

It is yet another object of the present invention to provide an access door for ducting systems which may be installed onto new ducting systems by welding or clipping, or retrofitted onto existing ducting systems without the need for welding, by using clips, thus eliminating the fire hazard creating by the welding process.

A still further object of the present invention is to provide an access door for ducting systems which has a small profile and is generally flush with the duct wall, therefore allowing installation and use of the access door in situations where there is limited space surrounding the ducting systems.

Yet another object of the present invention is to provide an access door for ducting systems which is a relatively inexpensive means for complying with and adhering to applicable codes and regulations, is simple to produce and is efficient in operation.

These objects, and other objects, features and advantages, of the present invention will become more apparent to one skilled in the art when the following detailed description of the preferred embodiments is read in conjunction with the appended figures, in which like reference numerals correspond to like parts throughout the several views.

BRIEF DESCRIPTION OF THE DRAWINGS

FIG. 8 is an exploded cross-sectional side view of the access door assembly shown in FIG. 5.

DETAILED DESCRIPTION OF THE PREFERRED EMBODIMENTS

Figure 1:
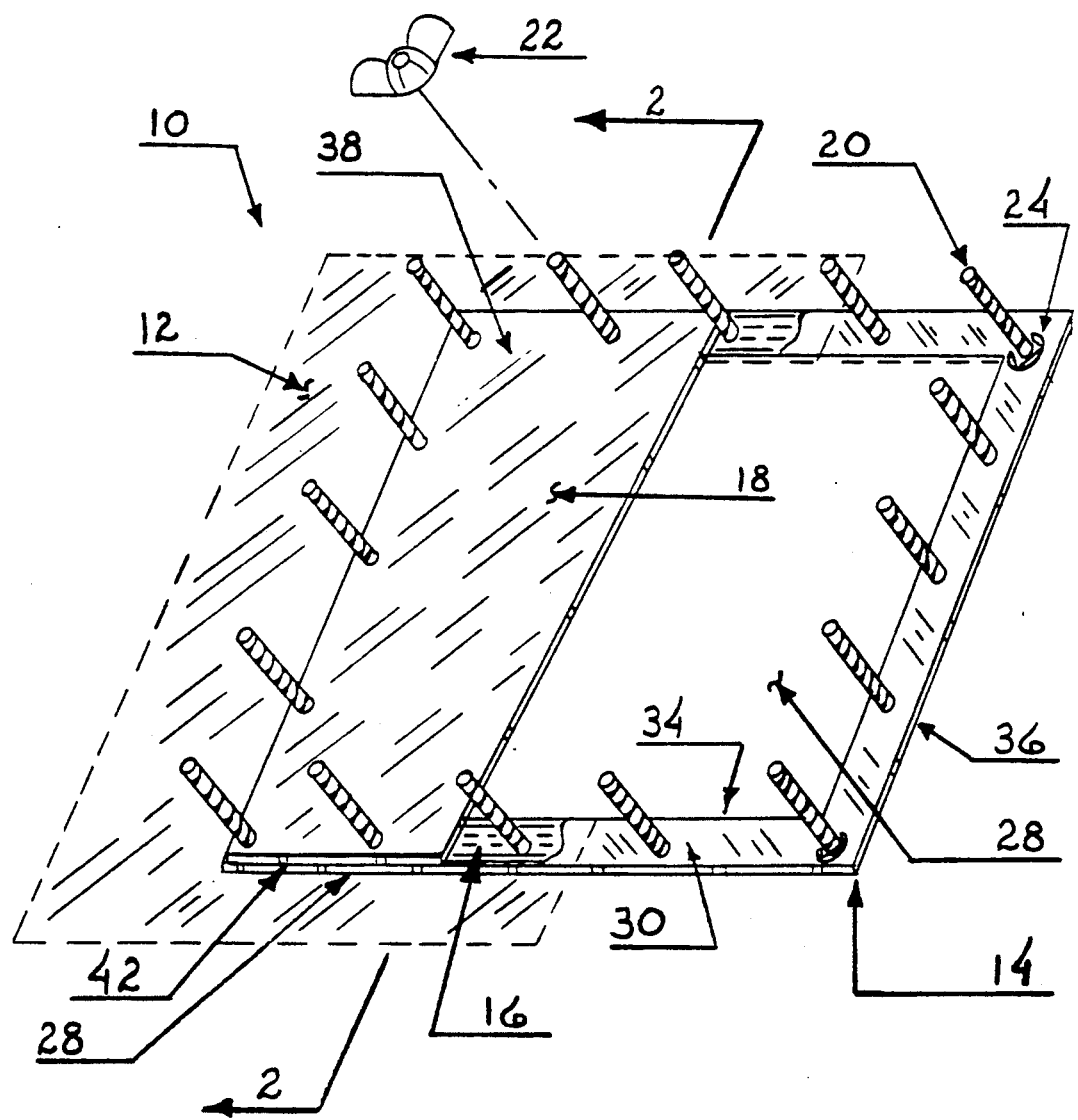
FIG. 1 is an isometric view of a preferred embodiment of the access door assembly of the present invention.
Figure 3:
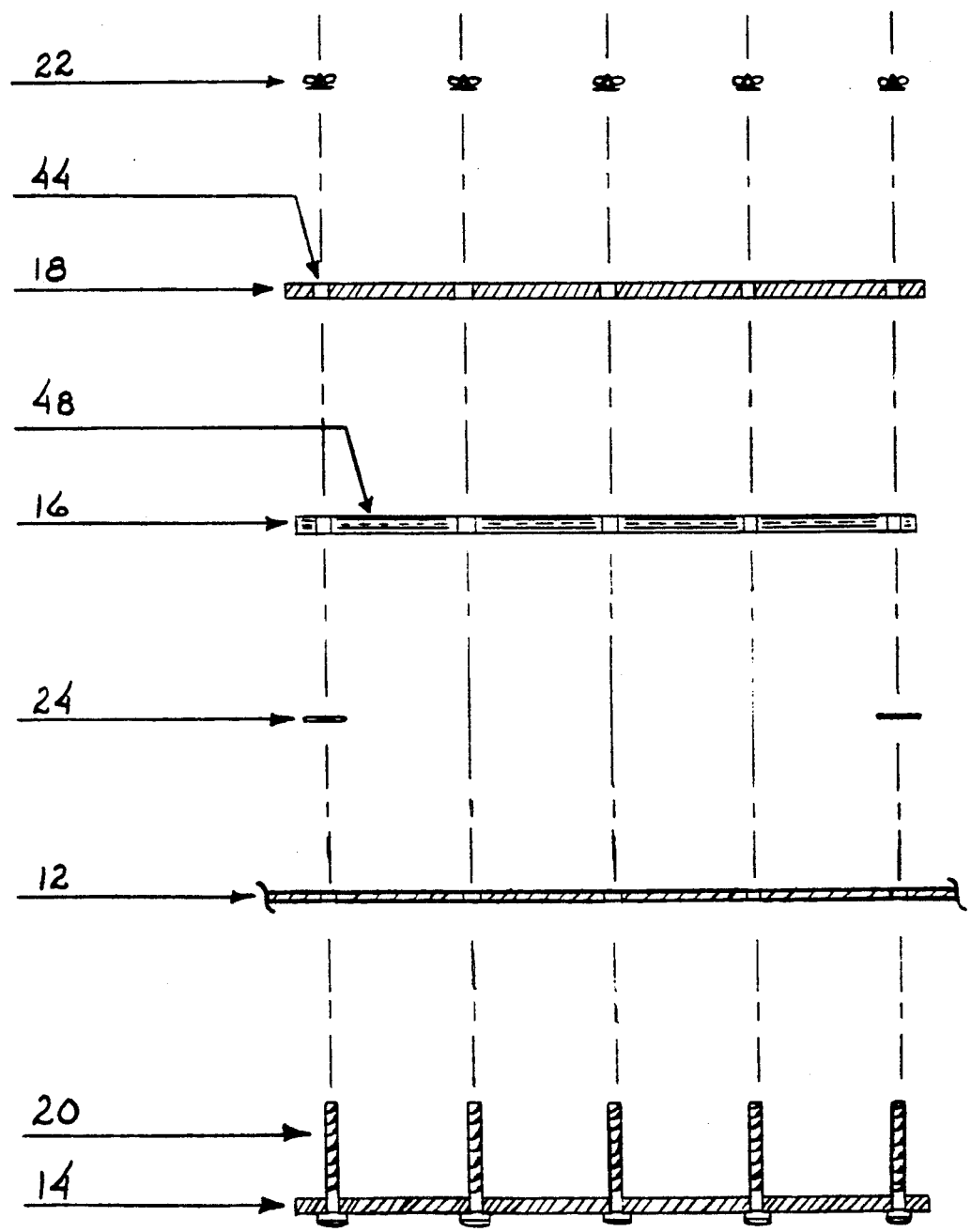
FIG. 3 is an exploded cross-sectional side view of the access door assembly shown in FIG. 2.
Figure 4:
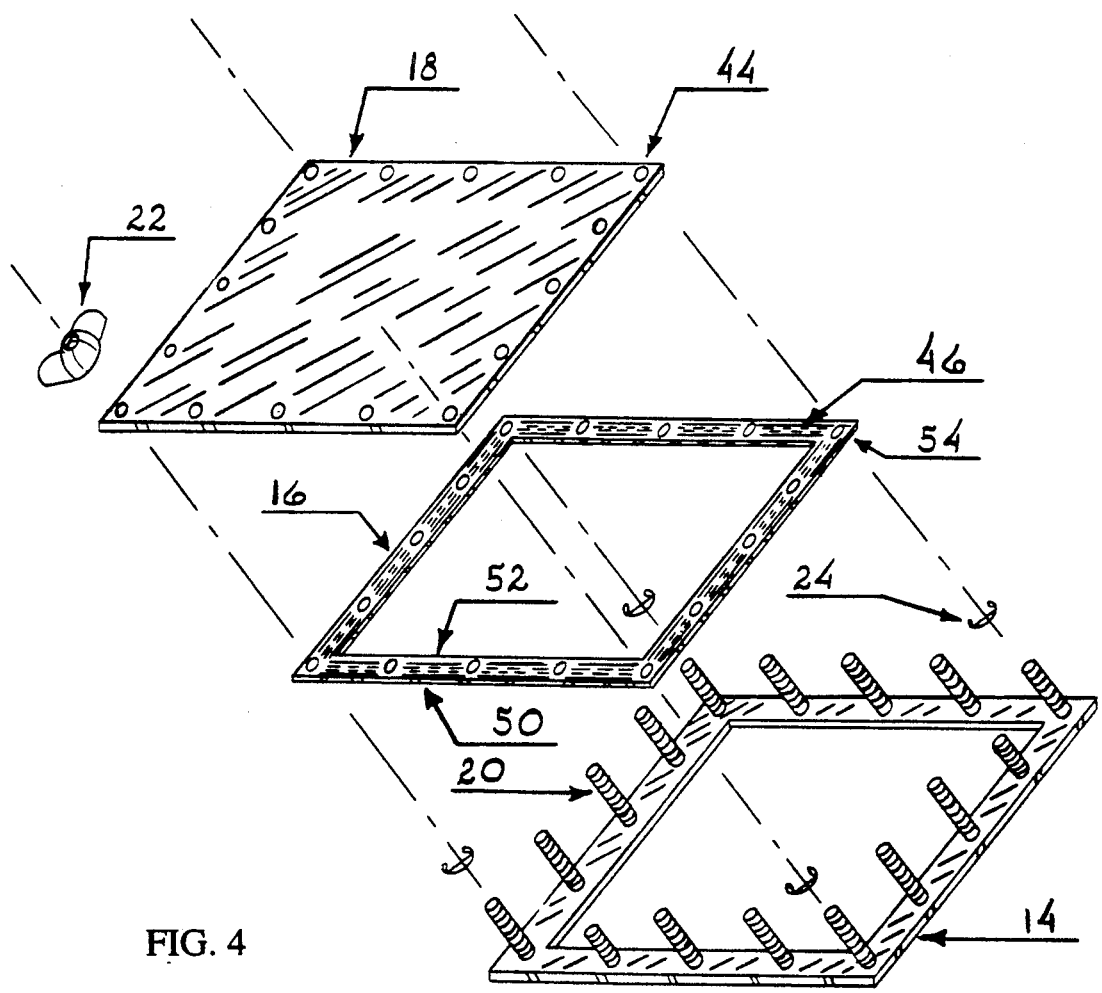
FIG. 4 is an exploded isometric view of the access door assembly, shown in FIG. 1.

Referring now to FIGS. 1 and 4, the access door assembly 10 constructed in accordance with the teachings of the present invention comprises frame 14, support studs 20, gasket 16, cover 18, and securing means 22. The two preferred embodiments contemplated at this time by the inventor are the retrofit embodiment shown in FIGS. 2 and 3 and the new installation embodiment shown in FIGS. 5 and 6, both of which will be described respectively below. The general components for each preferred embodiment are substantially similar, with the placement of the frame 14 on, and the method for attaching the frame 14 to, the duct 12 being variable. The access door assembly 10 is installed generally on the side wall or top of a typical hollow duct. While the description given below relates more to a duct having a rectangular cross-section, the access door assembly 10 can be constructed to be installed on a duct having a circular or other cross-section. The duct is standard, that is, a generally tubular elongated structure having an exterior wall surface, an interior wall surface, and being hollow.

Prior to installing the access door assembly 10 on the duct 12, an access port 28 must be cut in or be present on the duct 12. The access port 28 generally simply is a hole cut through the wall of the duct 12 from the ambient outside to the interior defined by the duct 12. The access port 28, and thus the access door assembly 10, can be of any size and shape; however, for the purposes of this description, a rectangular access port 28 cut into a flat duct wall 12 will be used to describe the invention. The access door assembly 10 preferably is installed onto the side wall of the duct 12. The access door assembly 10 is fitted around this previously formed access port 28 created in the duct wall 12.

The support frame 14 is constructed from a generally flat plate of material and is formed to have a first flat surface 30, a second flat surface 32, an inner perimetal edge 34, and an outer perimetal edge 36. The size and shape of the inner perimetal edge 34 corresponds with the size and shape of the access port 28 cut into the duct 12. The width of the frame 14, that is, the distance between the inner perimetal edge 34 and the outer perimetal edge 36, should be sufficient so as to create a support for the edging of the duct 12 immediately around the access port 28 and to support the support studs 20, without an undesirable amount of flexing. Additionally, the thickness of the frame 14, that is, the distance between the first flat surface 30 and the second flat surface 32, should be sufficient for the same support reasons. It has been found that a width of about two inches (2") and a thickness of about one-eighth of an inch ($\frac{1}{8}$") for a frame 14 constructed of plate steel is sufficient for these purposes. The frame 14 can be constructed of any materials which satisfy support and fire-resistance standards. The determination of the materials and the width and thickness of the materials to construct the frame 14 is obvious to one skilled in the art.

A plurality of support studs 20 are securely attached to the first flat surface 30 of frame 14 at predetermined intervals about the frame 14. Studs 20 depend normal from frame 14 and are constructed of a size and material sufficient to remain securely attached to frame 14, to support cover 18 as more fully explained below, and to cooperate with securing means 22, also as more fully explained below. Studs 20 preferably have a typical helical screw thread about their lengths, to cooperate with securing means 22 and e-clips 24, as more fully explained below. It has been found that the use of about sixteen (16) one inch (1") studs having a five-sixteenths of an inch (5/16") diameter, evenly spaced around frame 14, is sufficient for these port purposes. Typically, one (1) stud 20 is located at each corner of the frame 14, with three (3) studs 20 located between each stud 20. The number of studs 20 will depend on the size and configuration of the access door assembly 10; that is, smaller assemblies may employ fewer studs 20, while larger assemblies may employ more studs 20. However, it is preferable to have one stud 20 at each corner of frame 14 in all size assemblies.

Cover 18 comprises a generally flat rectangular plate having an outer surface 38, an inner surface 40, and a perimetal edge 42. Perimetal edge 42 typically is similar in size and shape to outer perimetal edge 36 of frame 14, but can be slightly smaller for various applications as more fully explained below. Just inside from perimetal edge 42, generally approximately one inch (1") from perimetal edge 42, a plurality of bores 44 are defined through cover 18 which correspond in interval location with studs 20, allowing studs 20 to extend through bores 44 when cover 18 is in its proper position on access door assembly 10.

Gasket 16 comprises a generally strong, nonasbestos, chemical resistive gasket material, which will remain flexible, and thus provide maximum sealability, during use. It has been determined that the gasket 16 should retain its integrity at operating temperatures of about 2300° F. so as to withstand the operating temperature of duct 12 and any grease fire which may occur within duct 12. Gasket 16 generally has approximately the same size and configuration as frame 14, having a door-side flat surface 46, a duct-side flat surface 48, an outer perimetal edge 50, and an inner perimetal edge 52. Similar to frame 14, gasket inner perimetal edge 52 has the same general size and configuration as the access port 28. Gasket outer perimetal edge 50 generally has the same size and configuration as the perimetal edge 42 of cover 18. The thickness of gasket 16, that is, the distance between door-side flat surface 46 and duct-side flat surface 48, is variable, but must be sufficient to create a fire resistant seal between cover 18 and frame 14 or duct 12 during use, as more fully explained below. Gasket 16 is attached to the inner surface 40 of cover 18, generally with a silicone elastomer sealant having excellent fire resistive, extension, and compression properties. Gasket 16 also has a plurality of bores 54 defined through it which correspond in interval location to studs 20 and bores 44, thus allowing studs 20 to extend through gasket 16 when the cover 18 and gasket 16 are in proper position on access door assembly 10. Similar to bores 44, bores 54 are located just inside from outer perimetal edge 50, generally approximately one inch (1") from outer perimetal edge 50.

Figure 2:
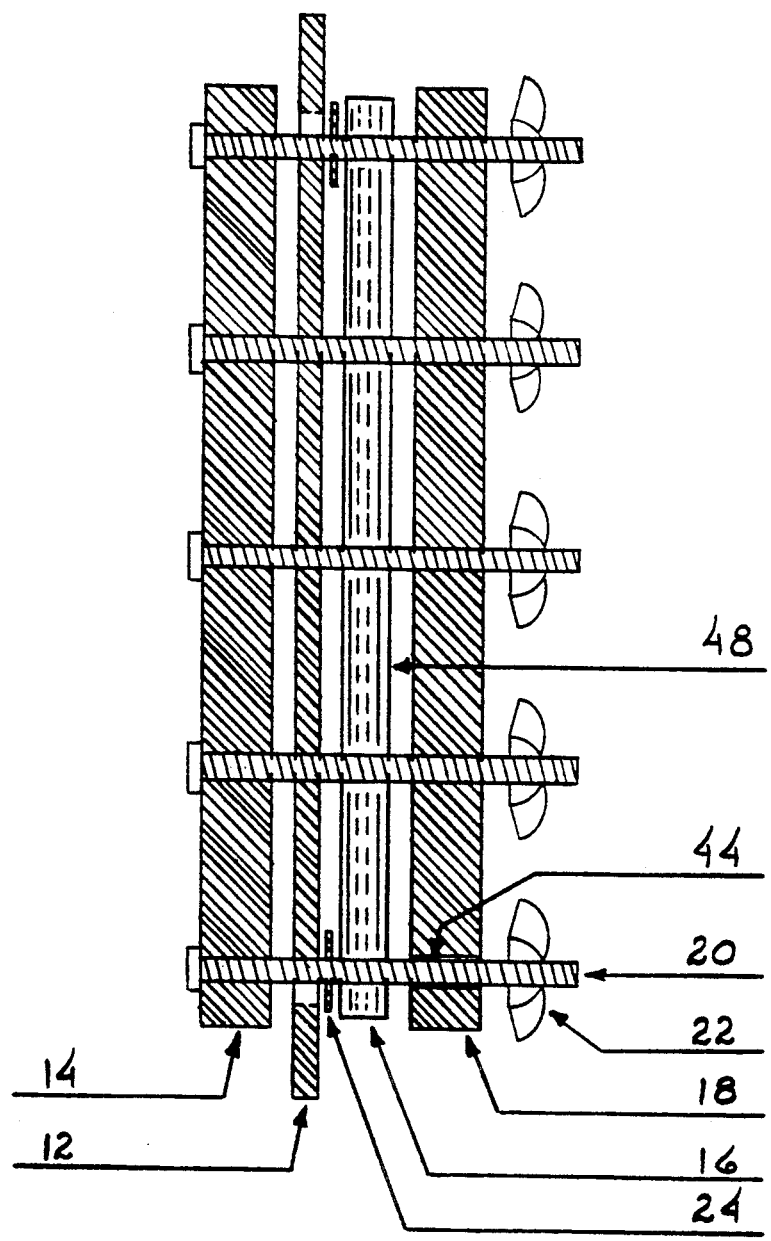
FIG. 2 is a cross-sectional side view of the access door assembly taken along line 2—2 of FIG. 1.

Referring now to FIGS. 2 and 3, the access door assembly 10 is shown in its retrofit embodiment. When retrofitting the access door assembly 10 onto existing ductwork, outer perimetal edge 36 of frame 14 can be the same size and shape as perimetal edge 42 of cover 18. An access port 28 having the same size and shape as inner perimetal edge 34 of frame 14 is cut into duct 12. Stud holes corresponding to studs 20 are drilled through duct 12 at appropriate positions. The size, shape and positioning of access port 28 and the stud holes can be provided via a template which may be provided along with the access door assembly 10. Preferably, access port 28 is located on the side of the duct 12, rather than on the top or bottom of duct 12.

Frame 14 is inserted into the interior of duct 12 through access port 28 and positioned such that studs 20 protrude outwardly through the stud holes and first flat surface 30 of frame 14 contacts the interior wall surface of duct 12. Frame 14 is held in place against the interior wall surface of duct 12 by using fasteners 24, such as e-clips, strategically placed on one or more studs 20. The use of an e-clip 24 on each of the corner studs 20 has been found to be adequate to hold frame 14 in proper position flush against the interior wall surface of duct 12. The e-clips 24 are positioned on studs 20 on the outside of the duct 12 such that the wall of duct 12 is sandwiched between e-clips 24 and frame 14. Thus, e-clips 24 cooperate with the helical screw thread on studs 20 and preferably are located on studs 20 such that frame 14 is held firmly against the interior wall surface of duct 12. Cover 18, with gasket 16 attached thereto, can now be placed over access port 28 and tightened against duct 12 using securers 22, such as wing nuts, on each stud 20. When cover 18 is secured over access port 28, gasket 16 will contact duct 12, creating a fire-resistant seal between cover 18 and duct 12 and closing access port 28.

Figure 5:
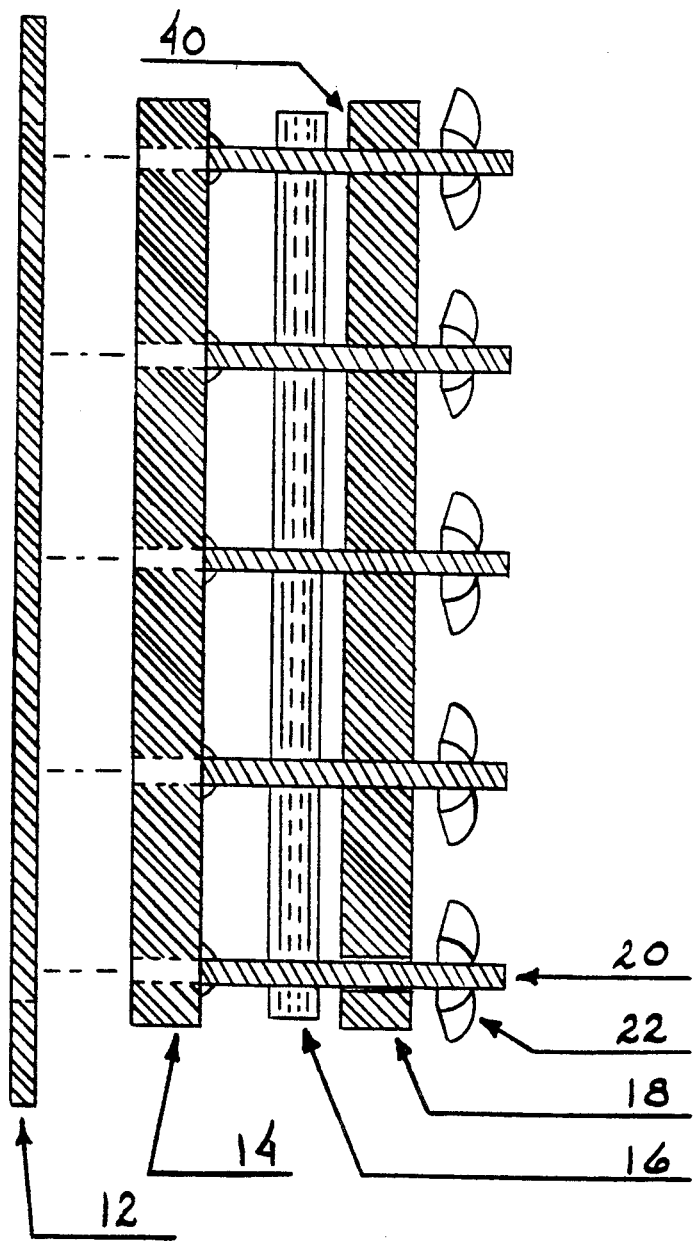
FIG. 5 is a cross-sectional side view of an alternate embodiment of the access door assembly also taken along line 2—2 of FIG. 1.
Figure 6:
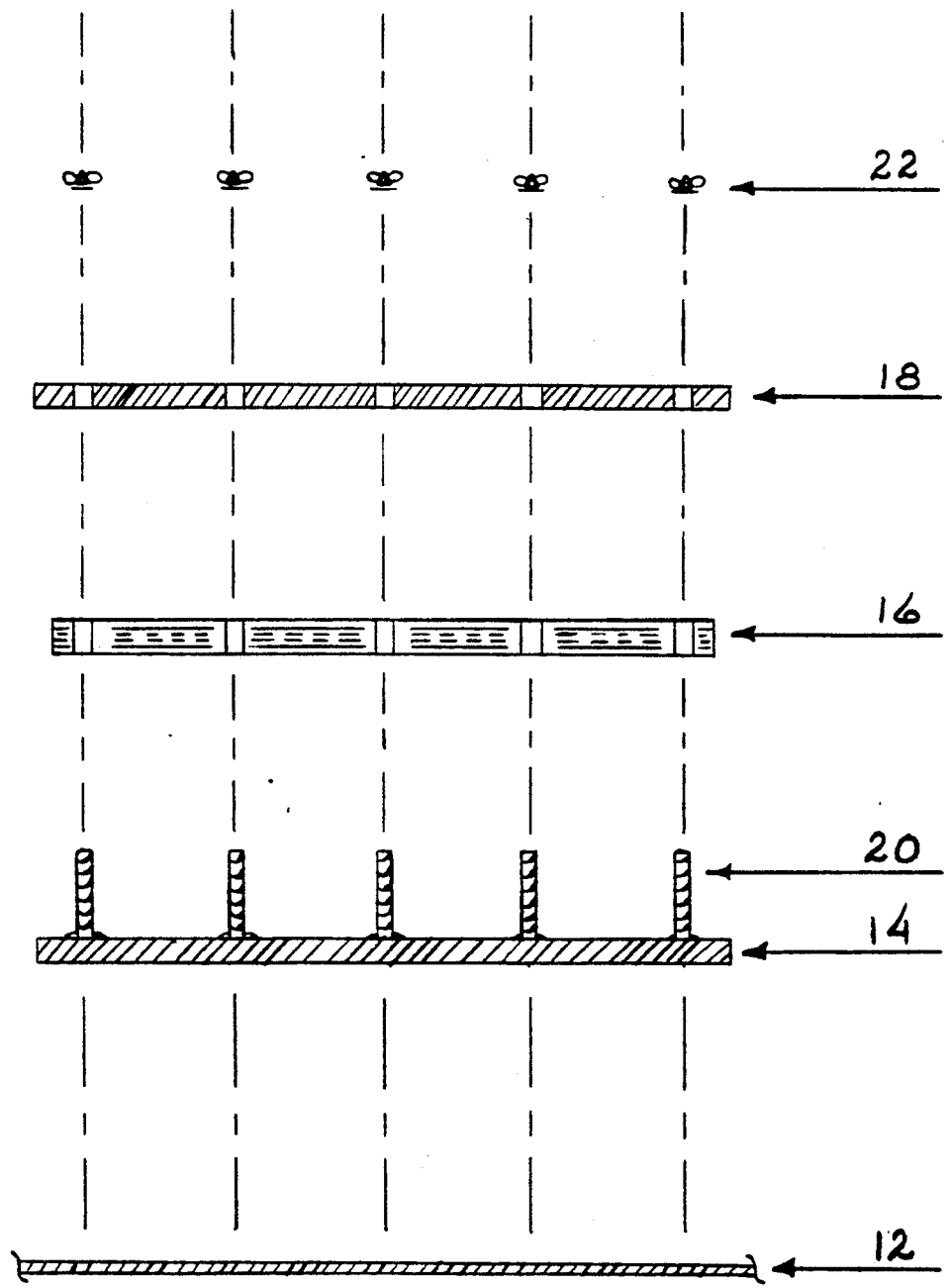

Referring now to FIGS. 5 and 6, the access door assembly 10 is shown in its new installation embodiment. In this embodiment, the frame 14 generally is welded onto the duct 12, as there is no fire hazard risk from grease buildup. Preferably, frame 14 is welded onto the exterior wall surface of duct 12; however, frame 14 may be welded onto the interior wall surface of duct 12 if feasible. It is preferable that outer perimetal edge 36 of frame 14 be somewhat larger in size and shape then perimetal edge 42 of cover 18 to allow for a welding area or bead about outer perimetal edge 36 to secure frame 14 onto duct 12. In this fashion the weld will not interfere with the placement of cover 18 and gasket 16 onto frame 14, cover 18 and gasket 16 fitting comfortably within the weldment.

Similar to the description given above for installing the retrofit embodiment, an access port 28 is cut into duct 12. As frame 14 is secured to the outer wall surface of duct 12, it is not necessary to cut stud holes through duct 12. Again, the size and shape of access port 28 should correspond with the size and shape of inner perimetal edge 34 of frame 14. Frame 14 is positioned on duct 12 such that inner perimetal edge 34 corresponds with the perimeter of access port 28 and then is welded onto duct 12 about outer perimetal edge 36, thus creating a complete seal about outer perimetal edge 36 between frame 14 and duct 12. Cover 18 along with the attached gasket 16, is then placed in position over studs 20, with studs 20 extending through bores 44. Cover 18 then is secured against frame 14 using securers 22, such as wing nuts. When cover 18 is secured over access port 28, gasket 16 contacts frame 14 if frame 14 is welded onto the exterior wall surface of duct 12 or contacts duct 12 if frame 14 is welded onto the interior wall surface of duct 12, and gasket 16 creates a fire-resistant seal between cover 18 and frame 14, or between cover 18 and duct 12, respectively. If frame 14 is mounted onto the interior wall surface of duct 12, stud holes similar to those described above for the retrofit embodiment will be necessary.

Constructing cover 18 out of 16-gauge steel has been found suitable to satisfy the various structural and safety codes, such as the Uniform Mechanical Code and the Standard Mechanical Code. Gasket 16 is attached to cover 18, rather than to duct 12 or frame 14, to reduce the possibility of destruction, abrasion, or other harm to gasket 16 by service personnel during the use of the access door assembly 10. Gasket 16 may suffer such harm if gasket 16 is attached to duct 12 or frame 14. Wing nuts are the preferred securer 22, as wing nuts allow cover 18 to be removed from access port 28 without the use of a tool, as required by the Uniform Mechanical Code and the Standard Mechanical Code.

The materials of construction for the various components are variable as long as they are satisfactory from structural and fire-resistivity standpoints. For example, but not to limit, frame 14, cover 18, studs 20 and securers 22 can be constructed from galvanized steel, stainless steel or carbon steel. Likewise, gasket 16 can be constructed from any fire-resistant sealing material.

Following are simplified, step-by-step instructions of the installation of the access door assembly 10 both in the retrofit embodiment and in the new installation embodiment. These instructions are given for example purposes only and it should be noted that various alternative methods of installing the access door assembly 10 can be utilized without departing from the scope of the invention.

To install the access door assembly 10 as a retrofit, select a suitable location on the duct 12 for the placement of the access door assembly 10. It generally is preferable to install the access door assembly 10 on the side or top of duct 12, whichever is more accessible. If duct 12 is insulated, the insulation must be trimmed back to expose a seamless side of the duct 12 slightly larger than outer perimetal edge 36 of frame 14. If any other components are attached to duct 12, such as wires or sheet metal wrap, these components must be trimmed, removed or repositioned prior to installing the access door assembly 10.

Stud holes are bored through duct 12 in the appropriate positions corresponding to the placement of studs 20 on the frame 14. Access port 28 then is cut in the appropriate position through duct 12. Frame 14 is inserted through access port 18 into the interior of duct 12, generally by turning frame 14 diagonally and slipping frame 14 through access port 18 along the diagonal. Frame 16 then is positioned on the interior wall surface of duct 12 such that studs 20 protrude through the stud holes bored into the duct 12 wall. Frame 14 should rest flush with and firmly against the interior wall surface of duct 12.

One e-clip 24 is placed on each corner stud 20 to hold frame 14 in place against the interior wall surface of duct 12. Cover 18 is then placed over access port 28 with studs 20 protruding through bores 44. Wing nuts 22 are then placed on each of studs 20 and tightened against the outer surface 38 of cover 18 such that gasket 16 contacts the exterior wall surface of duct 12 creating a fire resistant seal. Cover 18 can be installed and removed simply by tightening and loosening wing nuts 22.

To install the access door assembly 10 onto a new installation, select a suitable location on the duct 12 for the placement of the access door assembly 10. It generally is preferable to install the access door assembly 10 on the side or top of duct 12, whichever is more accessible. If duct 12 is insulated, the insulation must be trimmed back to expose a seamless side of the duct 12 slightly larger than outer perimetal edge 36 of frame 14. If any other components are attached to duct 12, such as wires or sheet metal wrap, these components must be trimmed, removed or repositioned prior to installing the access door assembly 10. Access port 28 then is cut in the appropriate position or duct 12.

Frame 14 is then welded onto duct 12 by placing frame 14 onto the duct 12 and lining up inner perimetal edge 34 of frame 14 with the edge of access port 28. Frame 14 is welded onto duct 12 by welding the entire perimeter of frame 14, that is along outer perimetal edge 36, to duct 12. It is important to have a continuous bead between frame 14 and duct 12 to create a fire resistant, closed seal. Cover 18 can be placed on and removed from access port 28 in the manner discussed above.

If it is desired to install frame 14 on the interior wall surface of duct 12, stud holes as described above for the retrofit embodiment are necessary. Frame 14 is installed in a similar fashion as in the retrofit embodiment, with a weldment about outer perimetal edge 36 being used in place of e-clips 24 to hold frame 14 against the duct.

The foregoing detailed description of preferred embodiments will be recognized by those skilled in the art as an access door assembly for ductwork venting systems which allows access to the interior of the ductwork in a low profile apparatus which satisfies various safety and structural codes. The access door assembly is fire resistant and easily installed onto existing ductwork or new ductwork. While the above description details the preferred embodiments, it should be understood that this description is not meant to limit the invention but that many variations of the various components and installation methods may be made and still fall within the scope and spirit of the invention as defined in the appended claims.

What is claimed is:

1. An access door assembly to allow access to the interior of a duct, comprising:

a frame releasably secured to the interior wall surface of the duct at a selected location on the duct where an opening in the duct previously had been created;

support studs integrally attached to and depending normal from said frame outwardly from said frame and from the duct;

a cover releasably secured to said frame for closing the opening in the duct;

gasket means which can withstand temperature resulting from burning debris located in the duct; and securing means for releasably securing said cover to said frame; wherein, said gasket means is securedly attached to said cover, said cover is releasably secured to said frame by said securing means cooperating with said support studs, and said gasket means being located between said cover and said frame whereby when said cover is releasably secured to said frame said gasket means is located between said cover and said frame to assist in preventing communication between the inside of the duct and the ambient.

2. The access door assembly as claimed in claim 1, wherein said support studs protrude from the interior of the duct through holes bored in the wall of the duct.

3. The access door assembly as claimed in claim 1, wherein said frame is secured to the duct by a mounting means.

4. The access door assembly as claimed in claim 3, wherein said mounting means are e-clips.

5. The access door assembly as claimed in claim 1, wherein said cover comprises bores corresponding to said support studs, said support studs extending through said bores and supporting said cover.

6. The access door assembly as claimed in claim 1, wherein said support studs are generally cylindrical and comprise a helical screw thread, and said securing means are nut-like components having an internal helical screw thread which cooperates with said screw thread on said support studs.

7. The access door assembly as claimed in claim 1, wherein said frame is mounted on the outside wall surface of the duct.

8. A method for installing an access door assembly onto a duct, comprising the steps of:

a. providing a frame having an outer perimetal edge and an inner perimetal edge;

b. creating an access port in the wall of the duct wherein the dimensions of said access port substantially correspond to those of the inner perimetal edge of said frame;

c. releasably securing said frame to the interior wall surface of the duct whereby said access port corresponds with said inner perimetal edge of said frame;

d. providing a means for releasably securing a cover to said access port; and e. providing a means for sealing said cover to said access port.

* * * * *